United States Patent [19]

Catelli

[11] Patent Number: 4,543,879
[45] Date of Patent: Oct. 1, 1985

[54] PLANT FOR BRINGING ABOUT ENZYME-DEACTIVATION IN FRUIT AND VEGETABLES: TOMATOES IN PARTICULAR

[75] Inventor: Camillo Catelli, Parma, Italy
[73] Assignee: Rossi & Catelli S.p.A., Italy
[21] Appl. No.: 630,017
[22] Filed: Jul. 12, 1984

Related U.S. Application Data

[62] Division of Ser. No. 448,795, Dec. 10, 1982, abandoned.

[30] Foreign Application Priority Data

Dec. 10, 1981 [IT] Italy ................................. 40125 A/81

[51] Int. Cl.⁴ ............................................. A23L 1/212
[52] U.S. Cl. ........................................ 99/472; 99/483; 99/516
[58] Field of Search ................. 99/467, 470, 472, 483, 99/484, 516, 534, 536, 537, 538; 426/518–520, 388, 615, 387, 489

[56] References Cited

U.S. PATENT DOCUMENTS 3,036,921 5/1962 Rietz .
3,549,384 12/1970 Walker et al. .
3,873,753 3/1975 Nelson et al. .................... 99/483 X Primary Examiner—Timothy F. Simone
Attorney, Agent, or Firm—Darby & Darby

[57] ABSTRACT

The invention relates to a technological process for deactivating enzymes in fruit and vegetables, and to plant used therefor—tomato being the example adopted. The process basically speaking is one of feeding-in whole tomatoes under vacuum, chopping or mashing them in conditions where residual oxygen is reduced to a minimum—depending upon the degree of vacuum obtainable inside the feeder-tank—and then introducing the tomato in its liquidized state into a pressurized system or circuit designed for operation at whatever temperature represents the optimum for enzyme-deactivation; the introduction of freshly-mashed deaerated tomato into the circuit being such that it mingles with tomato already heated and circulating therein. Plant for carrying such a process into effect comprises a closed circuit operating either at atmospheric or imposed pressure, in which heated tomato is caused to circulate by means of a pump, and a mincer which chops up the raw produce in conditions where attendant oxygen is minimal, prior to its entry into the circuit; also, a heat exchanger for raising the temperature of tomato circulating within the system, a pump for propulsion of the produce thereinto, and a pump for drawing off the ensuing product therefrom.

6 Claims, 3 Drawing Figures

PLANT FOR BRINGING ABOUT ENZYME-DEACTIVATION IN FRUIT AND VEGETABLES: TOMATOES IN PARTICULAR

This is a division of application Ser. No. 448,795, filed Dec. 10, 1982, abandoned.

BACKGROUND OF THE INVENTION

The invention described herein relates to a technological process and plant utilized therein, for deactivating the enzymes present in fruit and vegetables—tomatoes in particular.

Throughout the description, reference will in fact be made to the processing of tomatoes; nonetheless, the process and plant described herein may equally well be used for other produce—viz, fruit and vegetables in general.

When processing tomatoes—and especially when manufacturing tomato-pulp using the "Hot-Break" method—it is most important that the triturated, or minced tomato be heated to somewhere in excess of 90° C. so as to as reduce enzyme-activity to a minimum, since, once a tomato is broken up, this tends to destroy pectins contained in the pulp, leading in consequence to a lack of density in the final product. In systems currently employed this is done either by (a) heating the minced tomato by means of rotating coils in open-tank conditions, or (b) mingling freshly-minced tomato with ready-heated mince, at normal atmospheric pressure. In either event the temperature of the tomato will never rise beyond 99° C., since the plant functions at atmospheric pressure.

One advantage of the invention described herein is that it heats the minced tomato immediately to optimum temperature, from the point-of-view of enzyme-deactivation. Since the plant set forth herein is designed for pressurized operation, optimum temperature for deactivating enzymes might be determined—according to a given variety of produce—at anything between 95° and 140° C., since said temperature is no longer tied to conditions imposed by a plant functioning at atmospheric pressure.

A further advantage which the invention described herein offers over existing methods representative of the art, is that of enabling feed-in of the whole or minced tomato in a vacuum, thus preventing oxidization; indeed the mashing/chopping/mincing stage itself can be carried out under vacuum, with residual oxgen reduced to a minimum.

BRIEF DESCRIPTION OF THE DRAWINGS

Further features and advantages of the invention described herein will emerge more clearly from the detailed description of the process which follows, set forth as a preferred though not exclusive method, together with similarly preferred though not limitative embodiments of plant therefor—the enclosure accompanied by drawings in which.

DESCRIPTION OF THE PREFERRED EMBODIMENTS

Figure 1:
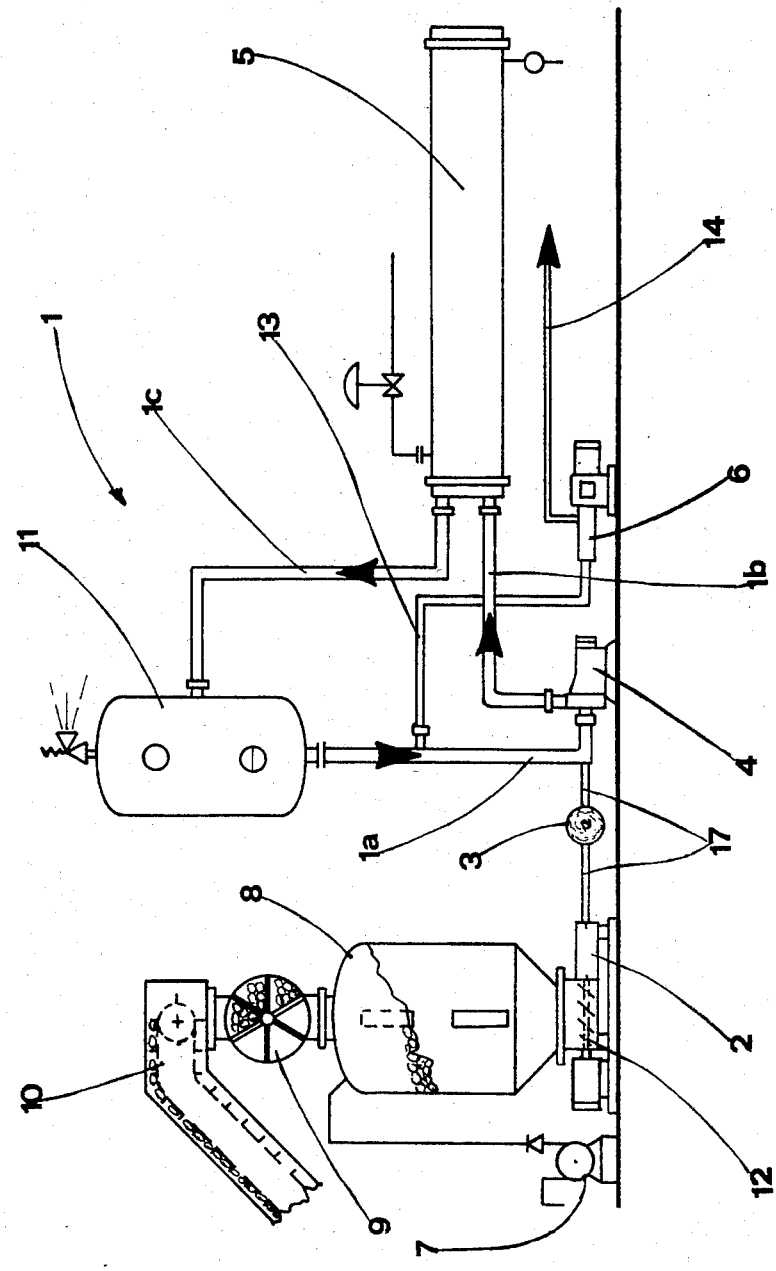
FIG. 1 shows one scheme illustrating a possible embodiment for plant to which the invention relates.

The process set forth by the invention is characterized in that tomato is fed into the plant in a vacuum, minced with attendant oxygen reduced to a minimum, and introduced almost instantly thereupon into surroundings already containing heated tomato such that the freshly minced comes into direct contact and mixes with said tomato already circulating therein. More precisely, these said surroundings are pressurized, and consist of a circuit or system wherein the product is heated and re-circulated unceasingly. Thus, tomato entering the pressurized circuit mingles with, is heated by, and becomes drawn along into the tomato-flow within said circuit, so that one achieves an immediate rise in the temperature of freshly-minced tomato upon its introduction into said circuit. The rapidity with which optimum heat in the fresh tomato is arrived at, varies according to the flow-rate ratio existing between the already-heated, and the freshly-introduced product: the greater the flow-rate of heated tomato with respect to that of the fresh, the swifter the corresponding rise in temperature of the latter; the principle thus stated being further dependent upon technological factors relative to the foodstuff being processed—whether this be tomato, as described above, or any other variety.

The process described herein also provides for the tomato's mincing, and its introduction into the aforementioned pressurized surroundings, to be carried out in conditions where oxygen-content is reduced to a minimum. In this way one avoids both deterioration of the minced tomato by dint of exposure to air, and, formation of air-bubbles within the actual circuit.

The plant utilized for carrying the above process into effect comprises: means for feeding-in tomato in a state of vacuum, means for triturating, or mincing said tomato with attendant oxygen reduced to a minimum, and a pressurized circuit incorporating a heat-exchanger, wherein tomato is caused to circulate.

The plant consists basically of a pressurized circuit 1 comprising pipework, viz: lines 1a, 1b and 1c, that stretch of the circuit between 1a and 1b incorporating re-circulating means designed to bring about repeated passage of the tomato around said circuit and consisting of a pump 4. Between line 1b and 1c one has heating means designed to raise the temperature of tomato circulating within the circuit, these being in the form of a tube-nest heat-exchanger 5. The plant also comprises a plenum chamber 11 located between lines 1c and 1a.

The plant to which the invention relates further comprises entry means by which to introduce tomato to the circuit-interior, consisting of a pump 2; also draw-off means for extraction of tomato therefrom, in the shape of further pump 6. Also envisaged are triturating, or chopping means—designed to break up the tomato—being a mincer 3 of conventional type located outside the actual circuit upflow of the point where minced tomato enters said circuit, and downflow of pump 2—being the means aforesaid for bringing about said entry. In short, mincer 3 is located on a further line 17 connecting the exit port of pump 2 with the tomato's actual point of entry into the pressurized circuit proper. Provision is made for a draw-off line 13 through which to extract tomato from the circuit, this joining with the circuit at a point other than that where entry-line 17 connects, and linking the circuit with extractor-pump 6, whence the tomato is propelled through an exit-line 14 to (a) successive stage/s in the manufacturing process.

The plant further comprises a tank 8 whose interior is maintained in a state of vacuum by means 7. Tomatoes to be processed reach the plant by way of a conveyor 10 and are sent into the tank itself 8 through a conventional type of star-wheel mechanism 9. A screw conveyor 12 located beneath the tank itself 8 propels the tomatoes toward pump 2 and thence through mincer 3 and into the pressurized circuit 1; the tomato's passage-on from the interior of tank 8 to the pressurized circuit being airtight.

Figure 2:
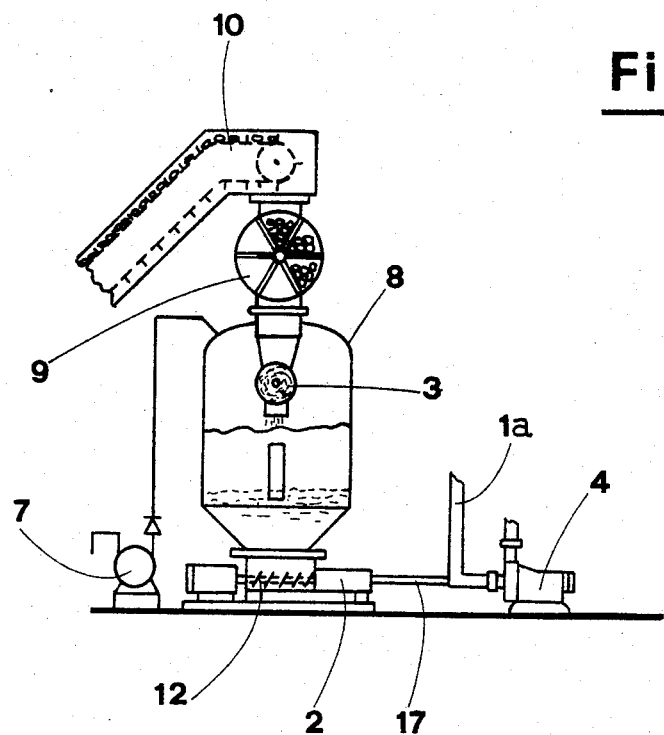
FIG. 2 shows another scheme, illustrating a second possible embodiment of the plant feeder-unit, according to the invention described herein.
Figure 3:
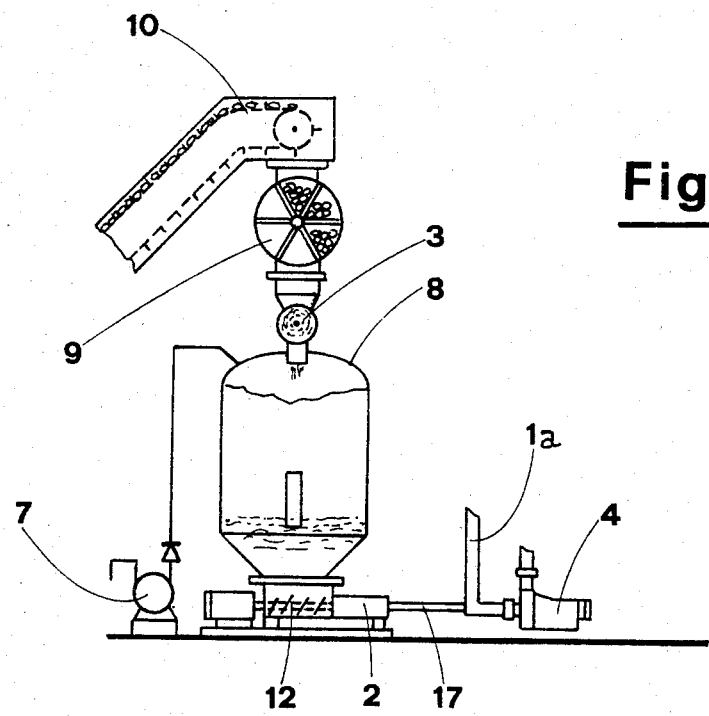
FIG. 3 shows a further scheme illustrating a third way of embodying the plant feeder-unit to which the invention relates.

In the embodiments illustrated in FIGS. 2 and 3, tomato is introduced into tank 8 already minced, and to this end mincer 3 may be located either within said tank 8 (see FIG. 2) or externally of same 8, in the latter case dropping the minced tomato straight into the tank 8 as in FIG. 3.

With this method one has the possibility of eliminating such air as is trapped within the product so as to propel it pure and unadulterated into the pressurized circuit.

It will be observed that tank 8 is not in fact a storage unit, since tomato does not remain static therein; the screw 12 and pump 2 make provision for its being continually drawn off from the tank 8 and propelled toward the pressurized circuit at great speed, with the result that trituration of the tomato is brought about in just a few seconds prior to its entry into the pressurized circuit.

The embodiments as illustrated in FIGS. 2 and 3 are likewise such as to keep the interval between the tomato's breaking up and its entry into the pressurized circuit within limits ensuring no deterioration in the foodstuff, and one has the additional facility of their being able to eliminate air from the substance, totally, before introduction thereof into the pressurized circuit.

The plant thus described functions as follows: given that the process is already under way—clearly the most meaningful illustration from the point of view of the enclosure—one has tomato already minced and circulating with the pressurized part of the plant. The fact that circuit 1 is pressurized means, in fact, that tomato therein can be held at a temperature well above 100° C.

In the embodiment illustrated in FIG. 1, tomatoes to be processed are drawn off under vacuum from tank 8 by screw 12, and propelled by pump 2 toward the mincer 3, whereupon they are broken up and duly introduced into said pressurized circuit 1. Both trituration and introduction into the circuit of the product are brought about in a vacuum, or at least with such air as remains reduced to a bare minimum, depending upon the degree of vacuum generated within tank 8.

In the embodiments shown by FIGS. 2 and 3, tomato arrives in tank 8 already broken up, with the result that the screw 12 and entry pump 2, in their turn, draw off the product and send it into the pressurized circuit already in its triturated state.

Once inside the pressurized circuit, the tomato newly introduced comes into immediate and direct contact with that already minced, heated and circulating within same, being thus raised almost instantaneously to a temperature of some 85° to 140° C., and as such high enough to ensure total deactivation of enzymes hitherto at work therein. By adjusting the heat-setting at the heat exchanger 5 exit, tomato introduced at the entry-point may be raised to the appropriate temperature at will.

Thus it will be clear, that in the event of produce requiring a high processing temperature between, say, 130° and 150° C.—whether tomato, as per the description, or indeed any other fruit or vegetable—the heat value required for bringing about enzyme-deactivation can be reached comfortably.

Tomato is drawn off from the pressurized circuit through line 13 by the extractor pump 6, and sent out via line 14 to the next stage/s in the process. The plenum chamber 11 would be included in the plant even though not strictly essential to its operation.

The temperature of the product circulating within the pressurized part of the system would be adjusted according to its nature and process. It should again be pointed out, at any rate, that pressurization of the circuit gives the facility—should the produce dictate— of raising the temperature of same to markedly high values (around 150° C.) so as to bring about instant deactivation of enzymes still at work in the triturated tomato, fruit or vegetable, upon entry thereof into the circuit.

It will be clear that means thus described could take any one of a number of guises, as indeed could the make-up of the pressurized circuit itself, and the plant would be accoutred with all such regulation and control systems as are normally envisaged for a set-up of the kind.

Numerous modifications of a practical nature may be made to the invention's constructive particulars without by any means straying from within such bounds of protection as are afforded to the basic concept by claims below.

What is claimed:

1. Apparatus adapted for bringing about enzyme-deactivation in produce, comprising:
    means for triturating the produce;
    a pressurized system communicating with the produce triturating means and through which the produce is caused to circulate;
    means communicating with the pressurized system and for substantially simultaneously introducing the produce into the pressurized system;
    means communicating with the produce triturating means and for exposing the produce to a vacuum prior to or substantially simultaneously with the introduction of the produce into the pressurized system so that the trituration of the produce and subsequent introduction thereof into the pressurized system are carried out with attendant oxygen reduced to a minimum value;
    means for heating the produce in the pressurized system; and
    means for recirculating a portion of the produce in the pressurized system in such a way that produce newly introduced into the pressurized system comes into direct contact and mingles with the product already present therein.

2. Apparatus as defined by claim 1, which further comprises means communicating with the pressurized system and for drawing off the produce from the pressurized system.

3. Apparatus as defined by claim 2 wherein the produce drawing off means is situated at a point in the pressurized system other than that of introduction of the produce thereinto.

4. Apparatus as defined by claim 1 wherein the produce heating means is adapted to raise the temperature of the produce within the pressurized system to above 100° C.

5. Apparatus as defined by claim 1, wherein the means for exposing the produce to a vacuum includes a tank having an interior that is maintained in a state of vacuum.

6. Apparatus as defined by claim 5, wherein the produce triturating means is situated within the interior of the tank.

* * * * *